W. W. COOPER.
Goniometer.
No. 56,013.            Patented July 3, 1866.
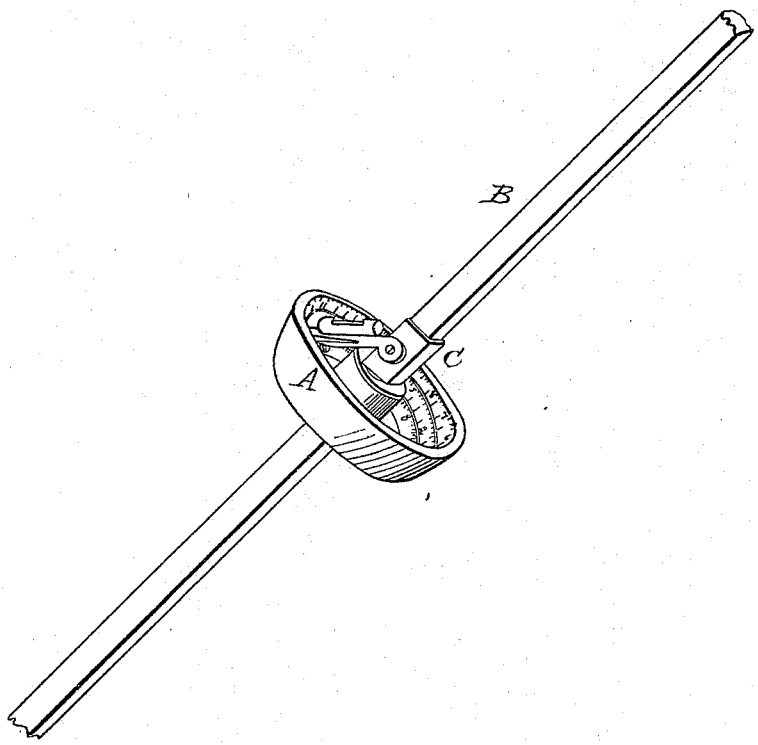
WITNESSES
Jn° M. McCalla
A. F. Pearl
INVENTOR
W. W. Cooper

UNITED STATES PATENT OFFICE.

WILLIAM W. COOPER, OF WASHINGTON, DISTRICT OF COLUMBIA.

IMPROVEMENT IN GONIOMETERS.

Specification forming part of Letters Patent No. 56,013, dated July 3, 1866.

*To all whom it may concern:*

Be it known that I, WILLIAM W. COOPER, of Washington city, in the District of Columbia, have invented a new and useful Goniometer, or Instrument for Measuring Vertical Angles with great precision, of which the following is a specification.

Said instrument (a full description of which follows) in construction is applicable to astronomical purposes, to the measurement of angles of elevation or of depression in determining heights, and to cask-gaging by the method described in the specification attached to my Letters Patent No. 50,689, granted under date of October 31, 1865, the record of which is on file in the Patent Office of the United States.

My vertical goniometer or angle-measurer consists essentially of a hollow spherical zone, of wood or metal, having cut on its inner surface a spiral groove of any number of coils, in which groove may play the pointed end of a spirit-level, the other end being coincident with the center of the sphere, and there attached by an axis, so that the pointed end may be free to move in the vertical.

As in the accompanying drawing, the cup A is a spherical zone, the upper limit of which corresponds to a parallel twenty degrees from the equator of the sphere. The bottom of the cup corresponds to the fiftieth parallel in the same hemisphere. Hence the cup, when revolved either on a square rod or bar B, as shown in the drawing, or on the tube of a telescope, carries, by means of the spiral groove, the free end of the spirit-level from the top to the bottom of the cup, and thus represents thirty degrees of vertical arc by the length of the spiral line, which (with a spherical radius of about an inch and a half) is almost twenty-five inches. The vertical arc is in fact expanded for graduation to thirty times its natural length by the spiral of three turns. The groove in the cup I cut with mechanical precision by a steel trident, made extensible as a radius and fixed at the spherical center, but free to move in the vertical, being thereby capable of cutting into either wood or metal with its hardened teeth. In one horizontal revolution of the cup the trident rises on a brass bearing temporarily fastened in the bottom of the cup, the bearing or inclined plane corresponding in outline to the lowest coil of the spiral. When the groove is cut, which is done by a single horizontal turn of the cup, the bearing is removed and the trident is replaced by a spirit-level, completing the instrument for graduation. The trident, while cutting, is pressed on by a simple spring, which causes it to rise evenly on the inclined edge of the brass bearing.

Instead of three, the grooving-tool may have six, or any number of teeth, giving in construction corresponding expansions of the grooved line for graduation, and so admitting of subdivisions of the line to represent the slightest changes perceptible in the most sensitive spirit-level.

The graduation seen in the drawing, although plotted from computation in degrees, minutes, and seconds of arc, is peculiar, being adapted to my system of gaging by angular measurement, which is described at length in Letters Patent No. 50,689. The least division of that graduation represents vertical-arc measure of about six minutes; hence it is obvious that by increasing the number of coils in making the groove, without increasing the diameter of the cup, graduation in degrees, minutes, and seconds may be distinctly marked equivalent to that on a plane limb of about thirteen feet radius.

The particular zone mentioned is also adapted to my system of gaging; but in constructing the goniometer here described there is no limitation whatever in that respect, the construction applying manifestly to the entire vertical quadrant. An initial pitch must, however, be given in mounting the spirit-level, if, for convenience in reading, a zone or quadrant is adopted different from that in which the absolute vertical measurements intended to be recorded will be normal.

The spirit-level shown in the drawing is mounted at the spherical center on a short metal sheath, C, the corners of which at the lower part are turned off so as to fit nicely in the round collar which springs from the bottom of the cup. The ends of the four metal slips that result from turning off the corners of the sheath are bent outward, so that when washers are passed on the sheath with the cup the insertion of the square rod B in the sheath binds the essential parts of the instrument firmly together. The cup is then free to move up or down on the rod, and to revolve about it as an axis, and the spirit-level is free to move in the vertical by means of the spiral groove when the cup is turned on its axis.

A modification of the construction herein described is the application of the groove as a zigzag to any vertical segment whatever of the hollow hemisphere. Each line of the zigzag groove may then be made to represent exactly one degree of vertical-arc measure and its subdivisions to represent minutes and seconds. The construction of the instruments holds also for any unequal spiral, as well as for the spiral equable in its descent.

Another modification is to cut the groove on the outside of the spherical zone for greater convenience in reading the graduation, if special purposes should so require. In such construction the outer end of the brass tube which carries the level must be made to loop upward, so as to clear the absolute vertical descent of the point which travels in the groove.

The practicability of this modification is obvious, as is also the fact that the cup may be a conic frustum, if the free end of the spirit-level is made extensible by a small nicely-fitted spiral spring.

What I claim as my invention, and desire to secure by Letters Patent, is—

An instrument constructed substantially as herein described, and which, when made of pocket-size, or any other size, serves for measing vertical angles with great precision by means of a spirit-level and graduation made along a spiral or zigzag grooved to receive the free end of the case which carries the spirit-level bulb.

W. W. COOPER.

Witnesses:
JNO. M. MCCALLA,
A. F. PEARL.